Patented July 1, 1941

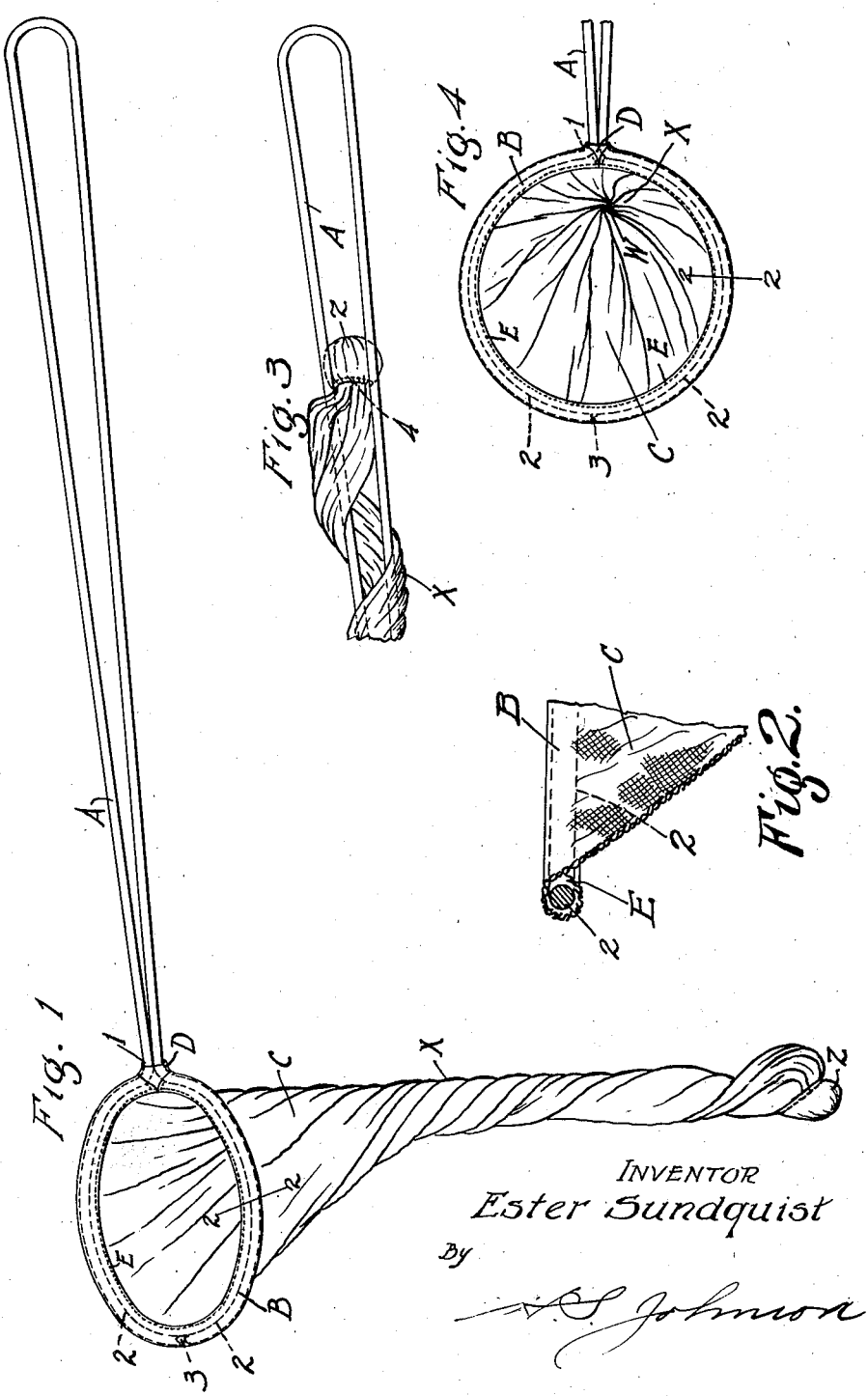

2,247,791

UNITED STATES PATENT OFFICE 2,247,791

INSECT AND FLY CATCHER

Ester Sundquist, St. Paul, Minn.

Application August 1, 1940, Serial No. 349,146

3 Claims. (Cl. 43—134)

This invention relates to catchers or traps for flies or other insects with a primary object of the invention being to provide a device which catches the flies or insects alive and without crushing them upon the object on which they alight, and then retain the entrapped insects until it is desired to remove them from the catcher.

Another object of the invention is to provide a device for trapping insects either individually or in swarms, which while having all the advantages of a fly-swatter has none of the disadvantages of leaving tell-tale spots of crushed flies or insects upon the walls.

In carrying out these objects the invention is susceptible to a range of modifications without departing or sacrificing any of the advantages claimed of the invention; there being shown in the drawing for illustrative purposes, a practical form in which:

Figure 1 is a perspective view of the invention showing the self closing spiral trap.

Figure 2 is a section taken on the line 2—2 of Figure 1 and Figure 4.

Figure 3 is an illustration of the handle of the catcher used as a locking means for the end of the spirally wrapped net wound about the handle in a spirally twisted form with the closure ball of the trap-sack locked within the handle.

Figure 4 is a plan view of my invention showing the spiral closure of the trap-sack.

In referring to the drawing which constitutes this invention, A represents a handle member which is bent at a predetermined point 1 to form loop members 2 that permit a slight expansion gap 3 between the loop members ends. The loop members 2 act as a support for the flexible self-closing spiral tubular sack C.

The flexible self-closing spiral tubular sack C is constructed of flexible straight weave net material sewn together to form a tube. The lower end of the material of the tube is then clustered together into a ball Z forming a closure for the sack formed from the tube permitting a slight bagging to one side of the sack near its closure end. The stitching 4 which retains the ball Z at the closure end of the sack imparts a pull upon certain longitudinal threads of the net material so as to cause a self spiraling of the material of the sack when the open end of the spiral sack is attached to the loop members 2 of the handle A with the ball Z closure being secured at a bias to the material of the sack causing the sack to form a self-closing spiral X which acts as an insect trap.

The open mounted end B of the spiral sack C is secured to the loop members 2 of the catcher handle A as shown in Figure 2 and sewn thereon through the stitching E. The mouth end B of the spiral sack C is secured about the loop members 2 of the handle A and forms a cushioned protection against direct metallic contact when striking an object.

At the junction 1, of the handle A and the spiral sack C, there is provided a crutch member O stitched to the sack member to envelop the crutch of the handle A.

In operation, when the spiral sack is swung through the air to catch an insect, the spiral of the sack unwinds and forms a straight sack passing through the air, being expanded by the air passing through the mouth of the same. When the momentum of the sack diminishes, the air pressure within the sack likewise diminishes and permits the sack to spiral and close. Should the user get the fly or insect into the mouth opening of the spiral tubular sack, the insect would then be forced to the closure end Z of the insect catcher.

When not in use the sack can be spirally wound by hand and then spirally wound about the handle, forcing the two handle members together to a degree which will permit the ball Z closure of the sack to be locked within the handle as best shown in Figure 3.

I claim:

1. A fly or insect catcher of the class described comprising a handle member and an end loop carried thereby, a flexible sack secured to said loop and means carried by the end of the sack for applying torsion to said sack to hold the sack in a spirally closed position.

2. A fly or insect catcher of the class described comprising a handle member and an end loop carried thereby, a flexible sack attached to said loop, a weighted portion carried in an offset position to said sack upon one end of the sack for applying a torsion to the sack and holding the sack twisted in a spirally closed position.

3. A fly or insect catcher of the class described comprising a handle member and an end loop carried thereby, a flexible and spirally closed sack attached to said loop, a ball end closure for said sack secured in an offset position, and means embodying the resilience of the handle for applying a lock to hold the ball end closure of the sack in locked position within said handle.

ESTER SUNDQUIST.